United States Patent
Tanaka

(10) Patent No.: US 8,551,231 B2
(45) Date of Patent: Oct. 8, 2013

(54) VAPORIZED FUEL TREATMENT APPARATUS

(75) Inventor: Hideki Tanaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/113,438

(22) Filed: May 23, 2011

(65) Prior Publication Data

US 2011/0290118 A1    Dec. 1, 2011

(30) Foreign Application Priority Data

May 27, 2010   (JP) ................................ 2010-121968

(51) Int. Cl.
*B01D 53/02*    (2006.01)
(52) U.S. Cl.
USPC ............................... 96/134; 96/139; 123/519
(58) Field of Classification Search
USPC .................................................. 96/108–154
See application file for complete search history.

(56) References Cited

U.S. PATENT DOCUMENTS

| | | | |
|---|---|---|---|
| 4,932,444 A * | 6/1990 | Micek | 141/59 |
| 7,261,093 B2 * | 8/2007 | Groom et al. | 123/520 |
| 7,677,277 B2 * | 3/2010 | Thompson et al. | 141/350 |
| 2008/0110889 A1 | 5/2008 | Ohsawa et al. | |
| 2008/0251055 A1 * | 10/2008 | Schmalz et al. | 123/519 |

FOREIGN PATENT DOCUMENTS

JP    2008-120287    5/2008

* cited by examiner

*Primary Examiner* — Duane Smith
*Assistant Examiner* — Joubert X Glover
(74) *Attorney, Agent, or Firm* — Smith, Gambrell and Russell, LLP

(57) ABSTRACT

In a vaporized fuel treatment apparatus a partition wall member is housed in an inner cap, and a gas-liquid separation chamber and a fuel adsorption chamber are defined on either side of the partition wall member. Further, a partition plate is provided on an open end of the inner cap. Wall portions are formed respectively on the partition wall member and the partition plate, and a conduction passage is defined in the fuel adsorption chamber by these wall portions. As a result, air containing vaporized fuel can be guided to every corner of the fuel adsorption chamber. Further, a through hole is provided in a central portion of the partition wall member, and therefore liquid fuel is prevented from flowing into the fuel adsorption chamber even when a fuel tank is tilted.

18 Claims, 8 Drawing Sheets

21: Canister (vaporized fuel processing apparatus)
22: Activated carbon (adsorbent)
30: Inner cap (housing)
38: Partition wall member
38a: Wall portion
39: Gas-liquid separation chamber
40: Fuel adsorption chamber
41: Partition plate (cover member)
41a: Wall portion
44: Conduction passage
46: Through hole 21: Canister (vaporized fuel processing apparatus)
22: Activated carbon (adsorbent)
30: Inner cap (housing)
38: Partition wall member
38a: Wall portion
39: Gas-liquid separation chamber
40: Fuel adsorption chamber
41: Partition plate (cover member)
41a: Wall portion
44: Conduction passage
46: Through hole (a)

(b)

(a)

(b)

VAPORIZED FUEL TREATMENT APPARATUS

CROSS-REFERENCE TO RELATED APPLICATIONS

The present application claims priority from Japanese Patent Application No. 2010-121968 filed on May 27, 2010, the entire contents of which are hereby incorporated by reference.

BACKGROUND OF THE INVENTION

1. Field of the Invention

The present invention relates to a vaporized fuel treatment apparatus that is attached to a filler neck of a fuel tank for use, and adsorbs vaporized fuel from the fuel tank.

2. Description of the Related Art

To adsorb vaporized fuel generated in a fuel tank, a tank cap type canister in which activated carbon serving as an adsorbent is charged into a tank cap has been proposed (see Japanese Unexamined Patent Application Publication No. 2008-120287, for example). With this kind of tank cap type canister, vaporized fuel can be treated using a simple construction, and therefore this type of canister is often employed as a vaporized fuel treatment apparatus for a general purpose engine or the like.

The canister described in Japanese Unexamined Patent Application Publication No. 2008-120287 is structured such that the activated carbon is simply charged into the tank cap, and it is therefore difficult to cause the vaporized fuel to travel to all of the activated carbon. In other words, a vaporized fuel adsorption efficiency of the activated carbon is low, and therefore a large amount of activated carbon must be charged into a large canister in order to secure a required vaporized fuel treatment capacity.

Further, when liquid fuel seeps into the activated carbon, a vaporized fuel adsorption performance of the activated carbon deteriorates, and it is therefore important to prevent liquid fuel from seeping into the activated carbon. In particular, in a general purpose engine that serves as a power source for various instruments, the fuel tank may vibrate or tilt, and therefore a structure for preventing liquid fuel from flowing into the activated carbon is required.

SUMMARY OF THE INVENTION

An object of the present invention is to achieve reductions in the size and cost of a vaporized fuel treatment apparatus and to prevent liquid fuel from flowing into an adsorbent.

A vaporized fuel treatment apparatus according to the present invention, which is attached to a filler neck of a fuel tank for use and adsorbs vaporized fuel from the fuel tank, includes: a housing attached to the filler neck; and a cover member provided on an open end of the housing, wherein, using a partition wall member housed in the housing as a boundary, a gas-liquid separation chamber is defined on a side of the filler neck and a fuel adsorption chamber housing an adsorbent is defined on a side of the cover member, a wall portion that defines a conduction passage within the fuel adsorption chamber, the wall portion being formed on at least one of the cover member and the partition wall member, and the vaporized fuel from the fuel tank is led from the gas-liquid separation chamber into the fuel adsorption chamber through a through hole formed in a central portion of the partition wall member, and then led to an outer peripheral portion of the housing, which communicates with the outside, through the conduction passage in the fuel adsorption chamber.

In the vaporized fuel treatment apparatus according to the present invention, as the wall portion, a cylindrical first wall portion is formed on the partition wall member and a cylindrical second wall portion having a different diameter dimension from the first wall portion is formed on the cover member.

In the vaporized fuel treatment apparatus according to the present invention, as the wall portion, a spiral wall portion is formed on at least one of the partition wall member and the cover member.

In the vaporized fuel treatment apparatus according to the present invention, a buffer chamber is defined between the gas-liquid separation chamber and the fuel adsorption chamber, and the gas-liquid separation chamber communicates with the fuel adsorption chamber via the buffer chamber.

According to the present invention, the conduction passage is defined in the fuel adsorption chamber housing the adsorbent, and therefore air containing vaporized fuel can be caused to travel to every corner of the fuel adsorption chamber. The vaporized fuel can therefore be adsorbed to the adsorbent efficiently. Hence, an amount of adsorbent charged into the fuel adsorption chamber can be reduced while securing a sufficient vaporized fuel treatment capacity, and as a result, reductions can be achieved in the size and cost of the vaporized fuel treatment apparatus.

Further, by providing the cover member on the open end of the housing, contact between the adsorbent and outside air can be suppressed by the cover member, and therefore the adsorbed vaporized fuel can be held without diffusing to the outside. Moreover, the gas-liquid separation chamber and the fuel adsorption chamber communicate with each other via the through hole formed in the central portion of the partition wall member, and therefore liquid fuel can be prevented from flowing into the fuel adsorption chamber even when the fuel tank is tilted.

DESCRIPTION OF THE PREFERRED EMBODIMENTS

Figure 1:
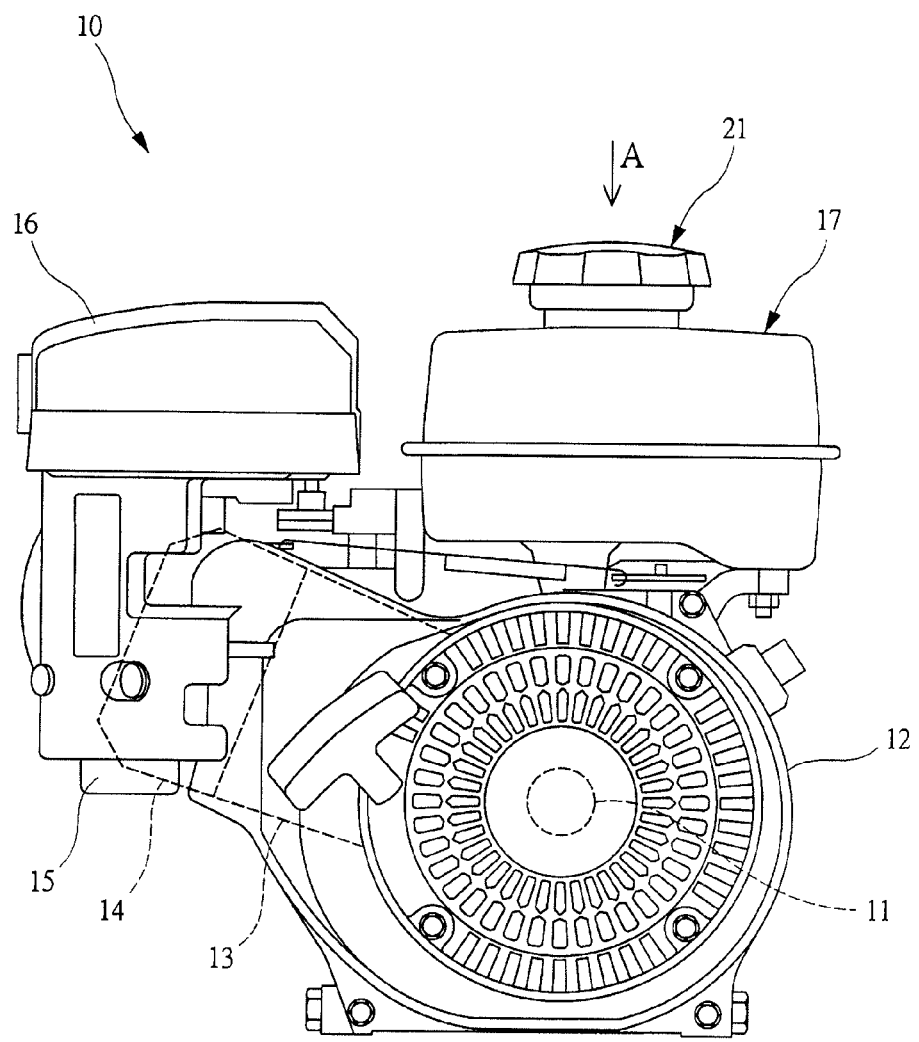
FIG. 1 is a side view showing a general purpose engine.

Embodiments of the present invention will be described in detail below on the basis of the drawings. FIG. 1 is a side view showing a general purpose engine 10. As shown in FIG. 1, the general purpose engine 10 includes a crank case 12 that supports a crankshaft 11 to be free to rotate. A cylinder 13 and a cylinder head 14 are incorporated into the crank case. Further, a carburetor 15 is connected to an intake port of the cylinder head 14, and a muffler 16 is connected to an exhaust port of the cylinder head 14. Furthermore, a fuel tank 17 storing fuel is mounted above the crank case 12.

Figure 2:
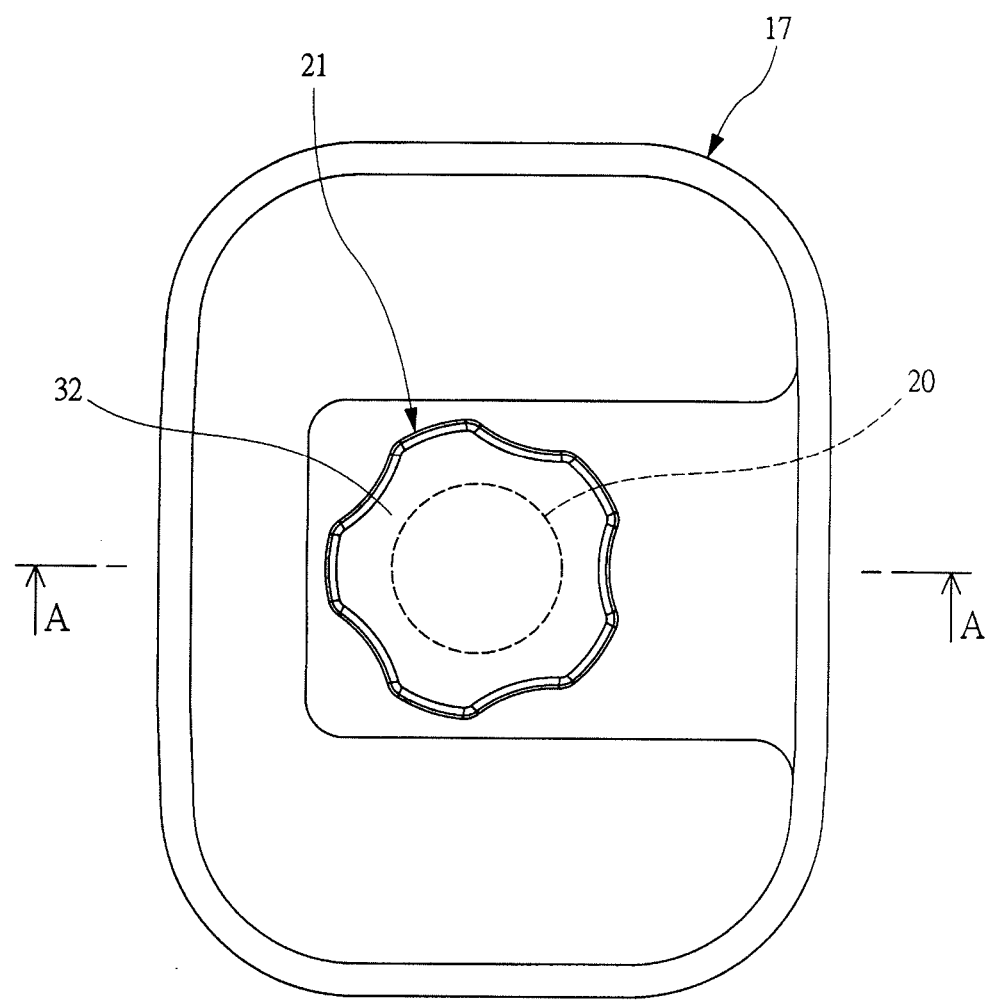
FIG. 2 is a plan view showing a fuel tank from the direction of an arrow A in FIG. 1.
Figure 3:
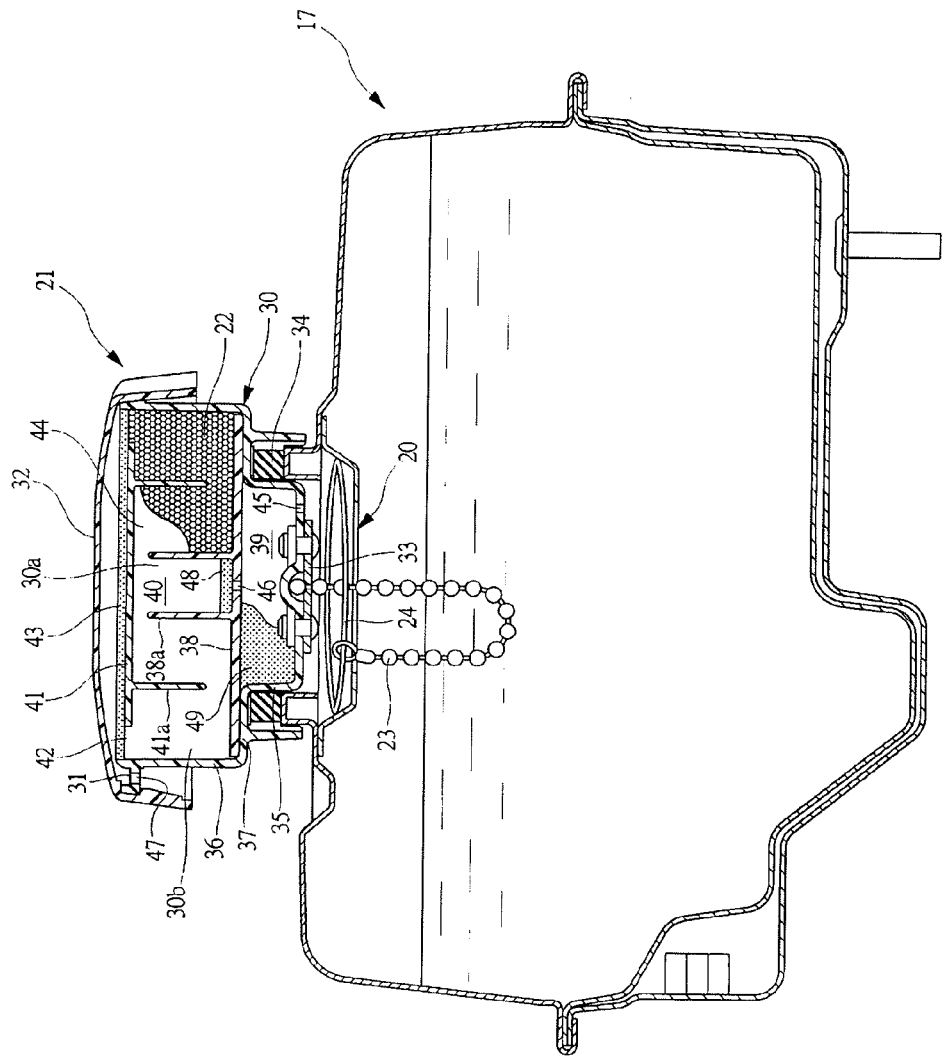
FIG. 3 is a sectional view showing the fuel tank along an A-A line in FIG. 2.

FIG. 2 is a plan view showing the fuel tank 17 from the direction of an arrow A in FIG. 1. FIG. 3 is a sectional view showing the fuel tank 17 along an A-A line in FIG. 2. As shown in FIGS. 2 and 3, a tank cap type canister 21 is attached to a filler neck (filler opening) 20 formed in an upper portion of the fuel tank 17. Activated carbon (an adsorbent) 22 for adsorbing vaporized fuel is charged into the canister 21 such that the canister 21 functions as a vaporized fuel treatment apparatus according to an embodiment of the present invention. A ring 24 is attached to the canister 21 via a chain 23, and the ring 24 is incorporated into the filler neck 20 of the fuel tank 17. By coupling the canister 21 to the fuel tank 17 in this manner, the canister 21 can be prevented from falling when detached from the fuel tank 17.

Figure 4:
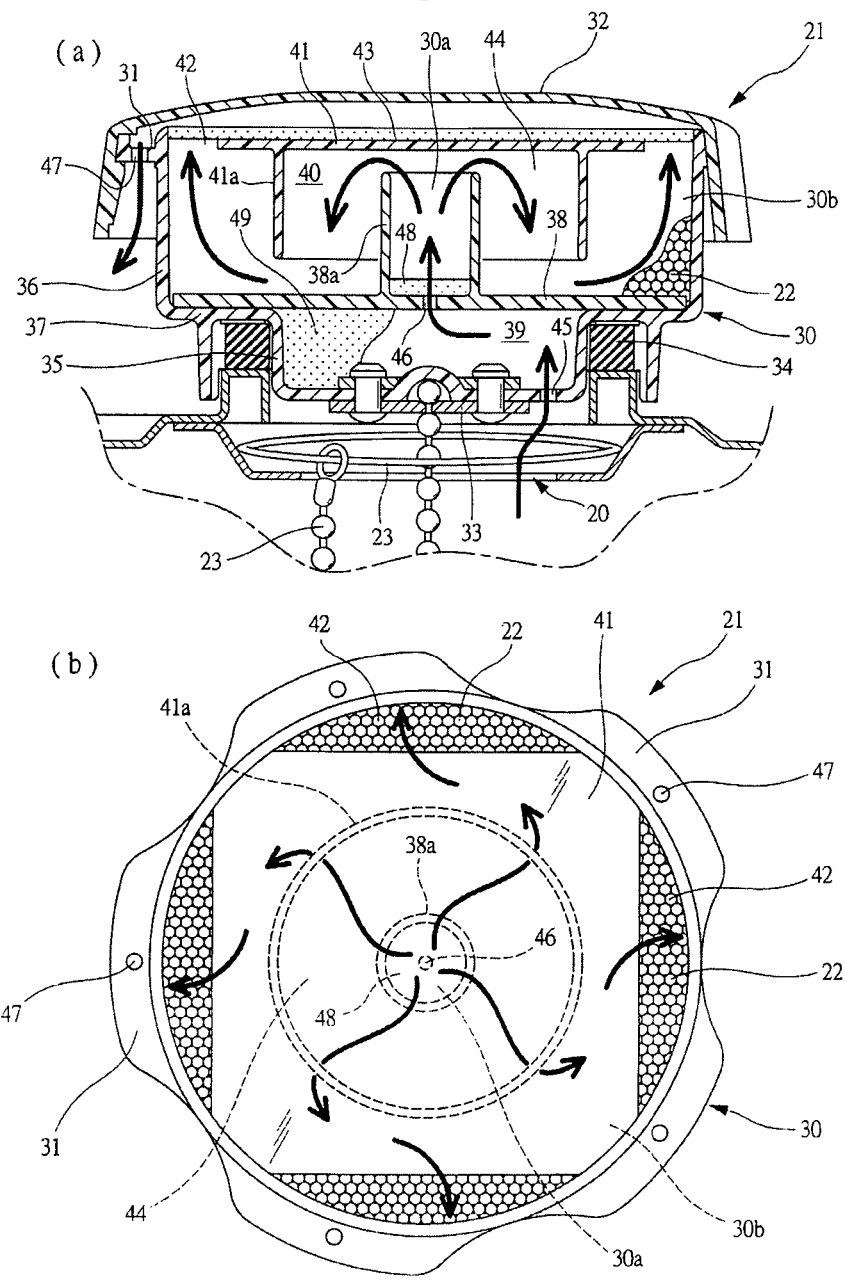
FIG. 4A is a sectional view showing an enlargement of a canister and the vicinity thereof.
FIG. 4B is a plan view showing the canister in a state where an outer cap and felt have been removed.

FIG. 4A is a sectional view showing an enlargement of the canister 21 and the vicinity thereof, and FIG. 4B is a plan view showing the canister 21 in a state when an outer cap 32 and felt 43, to be described below, have been removed. As shown in FIG. 4A, the canister 21 includes an inner cap 30 that serves as a housing and is attached to the filler neck 20, and the outer cap 32, which engages with a flange portion 31 of the inner cap 30. A plate member 33 is attached to a lower portion of the inner cap 30, and by fitting the inner cap 30 to the filler neck 20 and rotating the inner cap 30, the plate member 33 can be engaged with the filler neck 20. A gasket 34 for securing air-tightness is also attached to the lower portion of the inner cap 30.

The inner cap 30 is constituted by a small diameter cylindrical portion 35 and a large diameter cylindrical portion 36, and a disc-shaped partition wall member 38 is provided on a step portion 37 between the large diameter cylindrical portion 36 and the small diameter cylindrical portion 35. A gas-liquid separation chamber 39 is defined on a lower surface side of the partition wall member 38, and a fuel adsorption chamber 40 is defined on an upper surface side of the partition wall member 38. In other words, by housing the partition wall member 38 inside the inner cap 30, the gas-liquid separation chamber 39 is defined on the side of the filler neck 20 and the fuel adsorption chamber 40 is defined on the side of a partition plate 41, to be described below. The partition plate 41 is provided as a cover member on an open end of the inner cap 30 so as to be opposed to the partition wall member 38 with a predetermined interval. The partition plate 41 is formed to be smaller than an open surface of the inner cap 30, and therefore a predetermined gap 42 is formed between the inner cap 30 and the partition plate 41. Further, the disc-shaped felt 43 is provided on the open end of the inner cap 30 so as to cover the partition plate 41.

As shown in FIGS. 4A and 4B, a cylindrical first wall portion 38a is formed on the partition wall member 38 to extend toward the partition plate 41, and a cylindrical second wall portion 41a is formed on the partition plate 41 to extend toward the partition wall member 38. By providing the wall portions 38a and 41a on the partition wall member 38 and the partition plate 41, respectively, a conduction passage 44 is defined in the fuel adsorption chamber 40. The conduction passage 44 is formed to link a central portion 30a and an outer peripheral portion 30b of the inner cap 30. Further, a through hole 45 is formed in a bottom wall constituting the small diameter cylindrical portion 35 of the inner cap 30, and the gas-liquid separation chamber 39 communicates with the fuel tank 17 via the through hole 45. Furthermore, a through hole 46 is formed in a central portion of the partition wall member 38, and the gas-liquid separation chamber 39 communicates with the fuel adsorption chamber 40 via the through hole 46. Moreover, through holes 47 are formed in the flange portion 31 of the inner cap 30, and the fuel adsorption chamber 40 communicates with the outside via the through holes 47 and the gap 42. Note that disc-shaped felt 48 is provided in the central portion of the partition wall member 38 so as to cover the through hole 46.

A spongy foam material 49 is filled into the gas-liquid separation chamber 39 formed in the inner cap 30. Further, the activated carbon 22 is charged into the fuel adsorption chamber 40 formed in the inner cap 30 so as to fill the conduction passage 44. Note that in order to facilitate description of an air movement path, the foam material 49 is shown in only a part of the gas-liquid separation chamber 39, but in actuality, the foam material 49 is charged into the entire gas-liquid separation chamber 39. Similarly, the activated carbon 22 is shown in only a part of the fuel adsorption chamber 40, but in actuality, the activated carbon 22 is charged into the entire fuel adsorption chamber 40.

Next, a movement path of air discharged to the outside from the fuel tank 17 when an internal pressure of the fuel tank 17 rises due to a temperature increase or the like will be described. As shown by arrows in FIGS. 4A and 4B, air containing vaporized fuel is guided from the fuel tank 17 into the gas-liquid separation chamber 39 through the through hole 45 and then guided from the gas-liquid separation chamber 39 into the fuel adsorption chamber 40 through the through hole 46. In the fuel adsorption chamber 40, the vaporized fuel is adsorbed to the activated carbon 22, whereupon the air from which the vaporized fuel has been removed is discharged to the outside from the fuel adsorption chamber 40 through the gap 42 and the through holes 47.

As described above, the conduction passage 44 is defined in the fuel adsorption chamber 40, and therefore the air in the fuel adsorption chamber 40 travels toward the outer peripheral portion 30b from the central portion 30a while meandering up and down. In other words, a distance by which the air moves through the fuel adsorption chamber 40 can be increased in comparison with a case where the conduction passage 44 is not defined. As a result, the air containing the vaporized fuel can be caused to travel to every corner of the fuel adsorption chamber 40, and therefore the vaporized fuel can be adsorbed to a large amount of the charged activated carbon 22. Furthermore, by defining the conduction passage 44, a contact time between the activated carbon 22 and the vaporized fuel can be lengthened, and therefore an amount of vaporized fuel adsorbed to the activated carbon 22 can be increased. Hence, the vaporized fuel can be adsorbed to the activated carbon 22 efficiently, and therefore an amount of the activated carbon 22 charged into the fuel adsorption chamber 40 can be reduced while securing a sufficient vaporized fuel treatment capacity. As a result, reductions can be achieved in the size and cost of the canister 21.

Further, the partition plate 41 is provided on the open end of the inner cap 30 to cover the activated carbon 22 charged into the fuel adsorption chamber 40. By blocking the top of the fuel adsorption chamber 40 using the partition plate 41 in this manner, contact between the activated carbon 22 and outside air can be suppressed, and therefore the adsorbed vaporized fuel can be held without diffusing to the outside. Hence, the vaporized fuel can be held in the fuel adsorption chamber 40 until scavenging, to be described below, is performed, and as a result, a large improvement can be achieved in the vaporized fuel treatment capacity of the canister 21.

Furthermore, the gas-liquid separation chamber 39 is provided between the fuel tank 17 and the fuel adsorption chamber 40, and therefore liquid fuel does not flow directly into the fuel adsorption chamber 40 from the fuel tank 17. Thus, the liquid fuel can be prevented from flowing into the fuel adsorption chamber 40. Moreover, by providing the through hole 46 in the central portion of the partition wall member 38, liquid fuel can be prevented from flowing into the fuel adsorption chamber 40 even when the fuel tank 17 is tilted. Hence, liquid fuel can be prevented from seeping into the activated carbon 22, and as a result, the vaporized fuel treatment capacity of the canister 21 can be maintained.

Figure 5:
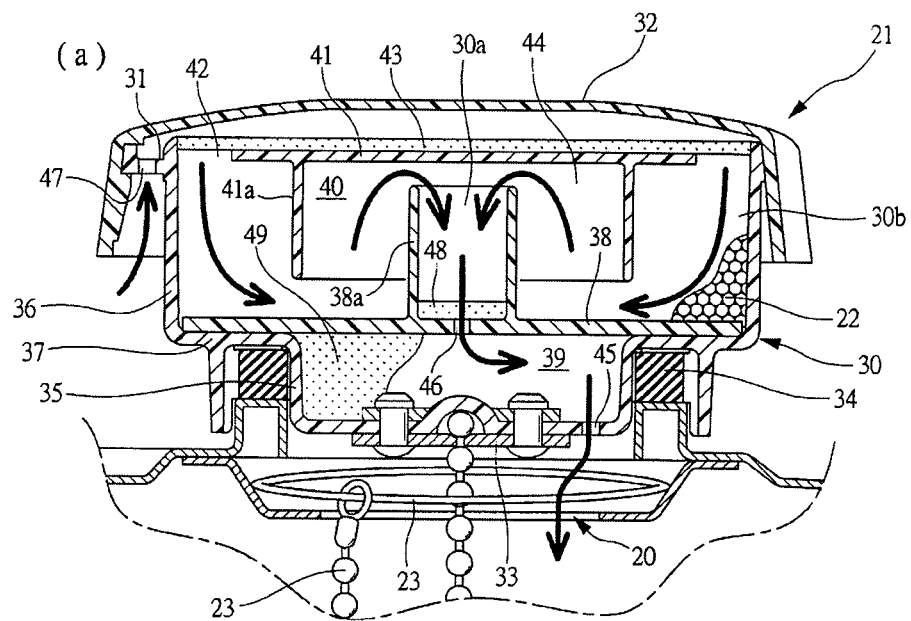
FIGS. 5A and 5B are illustrative views showing a flow of air that is taken into the fuel tank from the outside during scavenging.
Figure 5:
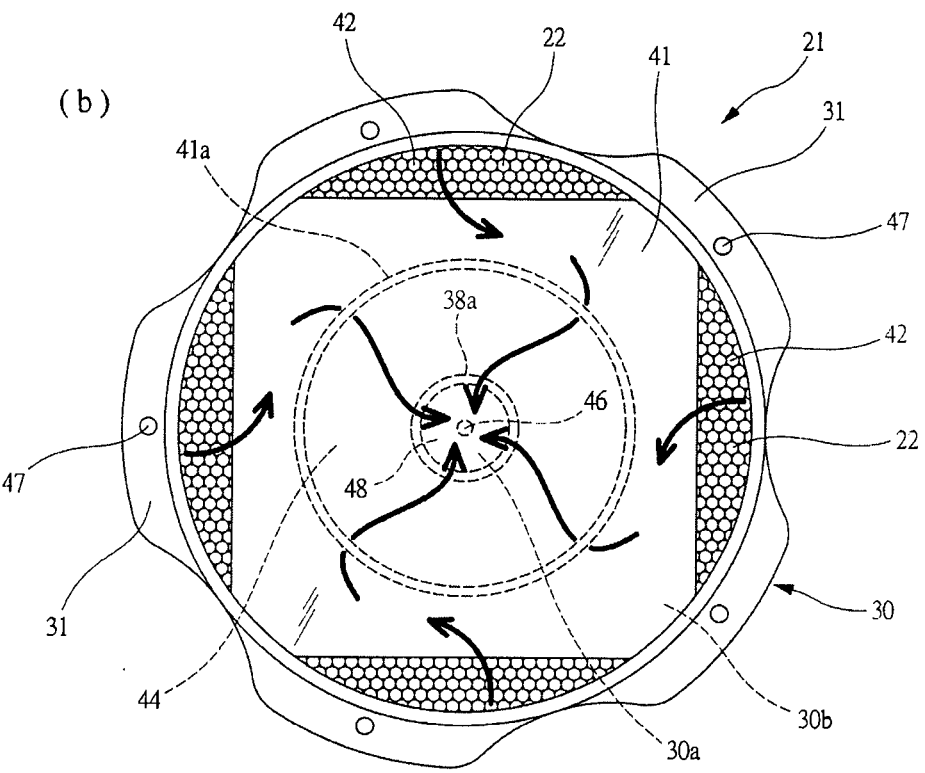

Next, a movement path of air taken into the fuel tank 17 from the outside when the internal pressure of the fuel tank 17 falls due to a fuel reduction, a temperature reduction, or the like will be described. Here, FIGS. 5A and 5B are illustrative views showing a flow of air that is taken into the fuel tank 17 from the outside during scavenging. Sites shown in FIGS. 5A and 5B correspond to the sites shown in FIG. 4. As shown by arrows in FIGS. 5A and 5B, when the internal pressure of the fuel tank 17 falls, air from the outside (to be referred to hereafter as outside air) is guided to the fuel adsorption chamber 40 through the through holes 47 and the gap 42. In the fuel adsorption chamber 40, vaporized fuel desorbed from the activated carbon 22 is taken into the outside air, whereupon the outside air containing the vaporized fuel is suctioned into the fuel tank 17 via the gas-liquid separation chamber 39. Thus, the vaporized fuel adsorbed to the activated carbon 22 in the fuel adsorption chamber 40 is returned to the fuel tank 17 together with the outside air when taken into the outside air in the fuel tank 17.

Further, the conduction passage 44 is defined in the fuel adsorption chamber 40, and therefore, as the outside air flows through the fuel adsorption chamber 40, the outside air travels toward the central portion 30a from the outer peripheral portion 30b while meandering up and down. As a result, the outside air can be caused to travel to every corner of the fuel adsorption chamber 40, and therefore the vaporized fuel can be desorbed from a large amount of the charged activated carbon 22. Furthermore, by defining the conduction passage 44 in the fuel adsorption chamber 40, a flow passage surface area can be reduced in comparison with a case where the conduction passage 44 is not defined, and therefore a flow velocity of the outside air through the fuel adsorption chamber 40 can be increased. As a result, a large amount of vaporized fuel can be taken into the outside air, and therefore an adsorption capacity of the activated carbon 22 can be restored to a large degree. Since the adsorption capacity of the activated carbon 22 can be restored to a large degree, the vaporized fuel treatment capacity of the canister 21 can be maintained.

Figure 6:
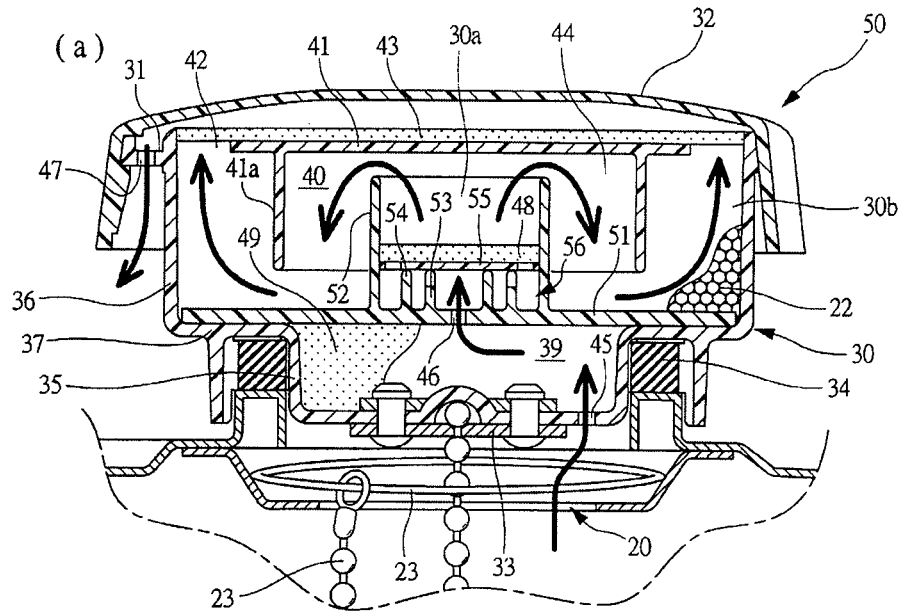
FIG. 6A is a sectional view showing an enlargement of a canister and the vicinity thereof.
FIG. 6B is a plan view showing the canister in a state where the outer cap and the felt have been removed.
Figure 6:
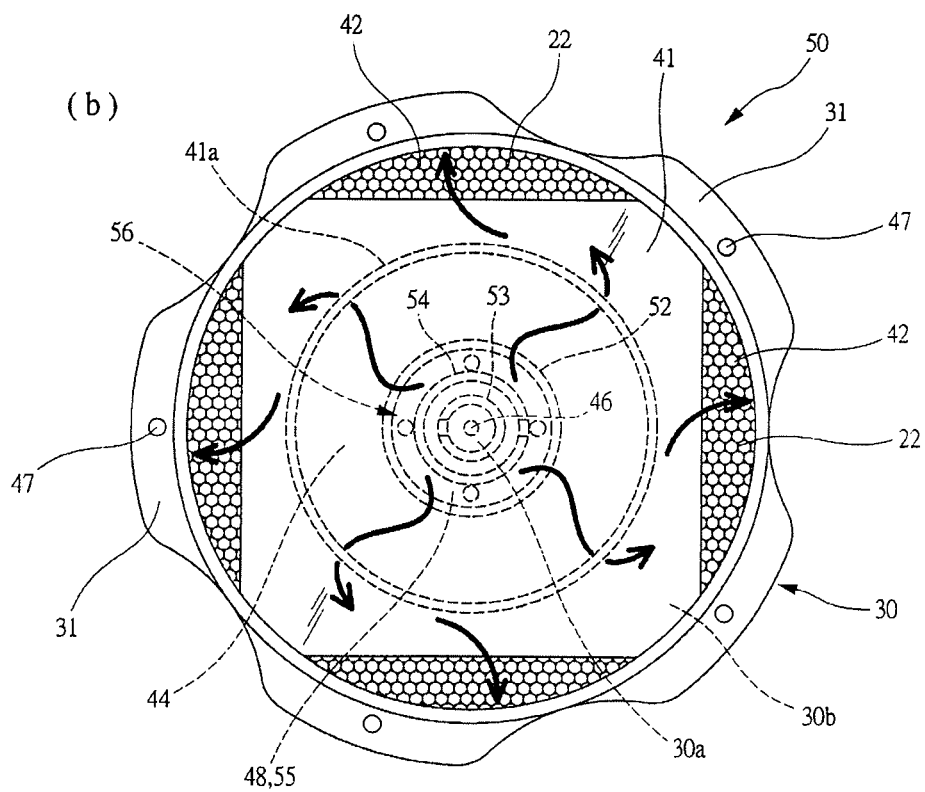

Next, a canister (vaporized fuel treatment apparatus) 50 according to another embodiment of the present invention will be described. Here, FIG. 6A is a sectional view showing an enlargement of the canister 50 and the vicinity thereof, and FIG. 6B is a plan view showing the canister 50 in a state where the outer cap 32 and the felt 43 have been removed. Note that in FIG. 6, similar members to the members shown in FIG. 4 have been allocated identical reference symbols, and description thereof has been omitted. Further, arrows in FIG. 6 show the movement path of the air discharged to the outside from the fuel tank 17.

As shown in FIGS. 6A and 6B, a cylindrical first wall portion 52 extending toward the partition plate 41 is formed on a partition wall member 51 housed in the inner cap 30.

Further, cylindrical buffer walls 53 and 54 that are lower than the wall portion 52 are formed in a central portion of the partition wall member 51 on an inner side of the wall portion 52. Furthermore, a disc-shaped lid member 55 is housed on the inner side of the wall portion, and a lower end surface of the lid member 55 contacts respective tip ends of the buffer walls 53 and 54. By housing the lid member 55 on the inner side of the wall portion 52 in this manner, a buffer chamber 56 is defined by the partition wall member 51 and the lid member 55.

Figure 7:
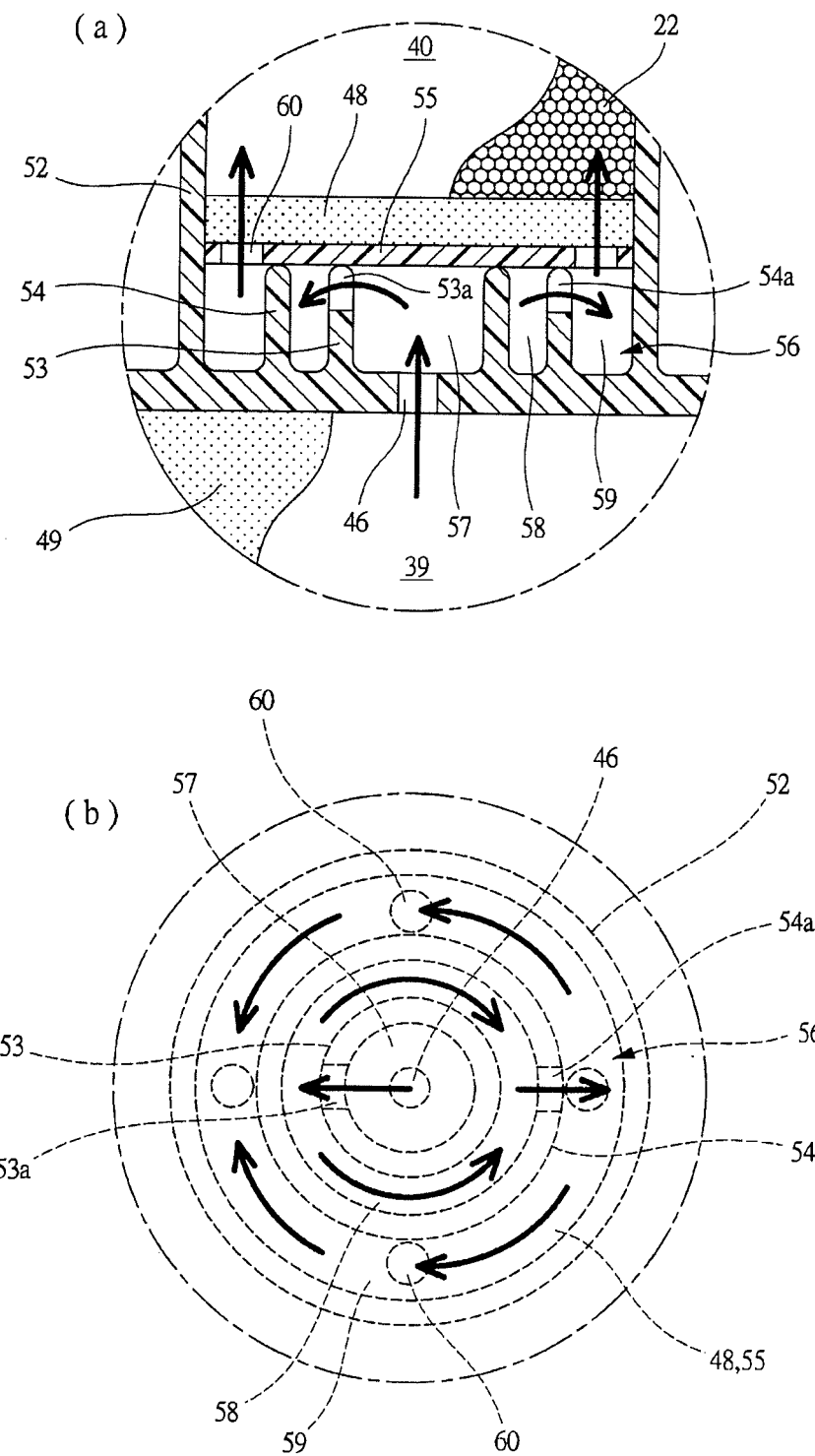
FIG. 7A is a sectional view showing an enlargement of a buffer chamber shown in FIG. 6A.
FIG. 7B is a plan view showing an enlargement of the buffer chamber shown in FIG. 6B.

FIG. 7A is a sectional view showing an enlargement of the buffer chamber 56 shown in FIG. 6A, and FIG. 7B is a plan view showing an enlargement of the buffer chamber 56 shown in FIG. 6B. As shown in FIGS. 7A and 7B, the buffer chamber 56 includes a first flow passage 57 defined on an inner side of the buffer wall 53, a second flow passage 58 defined between the buffer walls 53 and 54, and a third flow passage 59 defined on an outer side of the buffer wall 54. Further, a cutout 53a is formed in an upper portion of the buffer wall 53, and the first flow passage 57 communicates with the second flow passage 58 via the cutout 53a. Furthermore, a cutout 54a is formed in an upper portion of the buffer wall 54, and the second flow passage 58 communicates with the third flow passage 59 via the cutout 54a. Moreover, a through hole 60 is formed in an outer peripheral portion of the lid member 55, and the third flow passage 59 communicates with the fuel adsorption chamber 40 via the through hole 60. In other words, air guided from the gas-liquid separation chamber 39 into the first flow passage 57 through the through hole 46 is guided from the first flow passage 57 to the third flow passage 59 via the second flow passage 58 and then guided into the fuel adsorption chamber 40 through the through hole 60.

By providing the buffer chamber 56 between the gas-liquid separation chamber 39 and the fuel adsorption chamber 40 in this manner, liquid fuel can be prevented from flowing into the fuel adsorption chamber 40 even when the fuel tank 17 is tilted excessively such that the liquid fuel reaches the through hole 46. Moreover, the flow passages 57 to 59 are formed in the buffer chamber 56 in a maze-like form by the buffer walls 53 and 54, and therefore the liquid fuel can be prevented from flowing into the fuel adsorption chamber 40 even when the liquid fuel flows into the buffer chamber 56. Hence, the liquid fuel can be prevented from seeping into the activated carbon 22, and as a result, the vaporized fuel treatment capacity of the canister 50 can be maintained.

Figure 8:
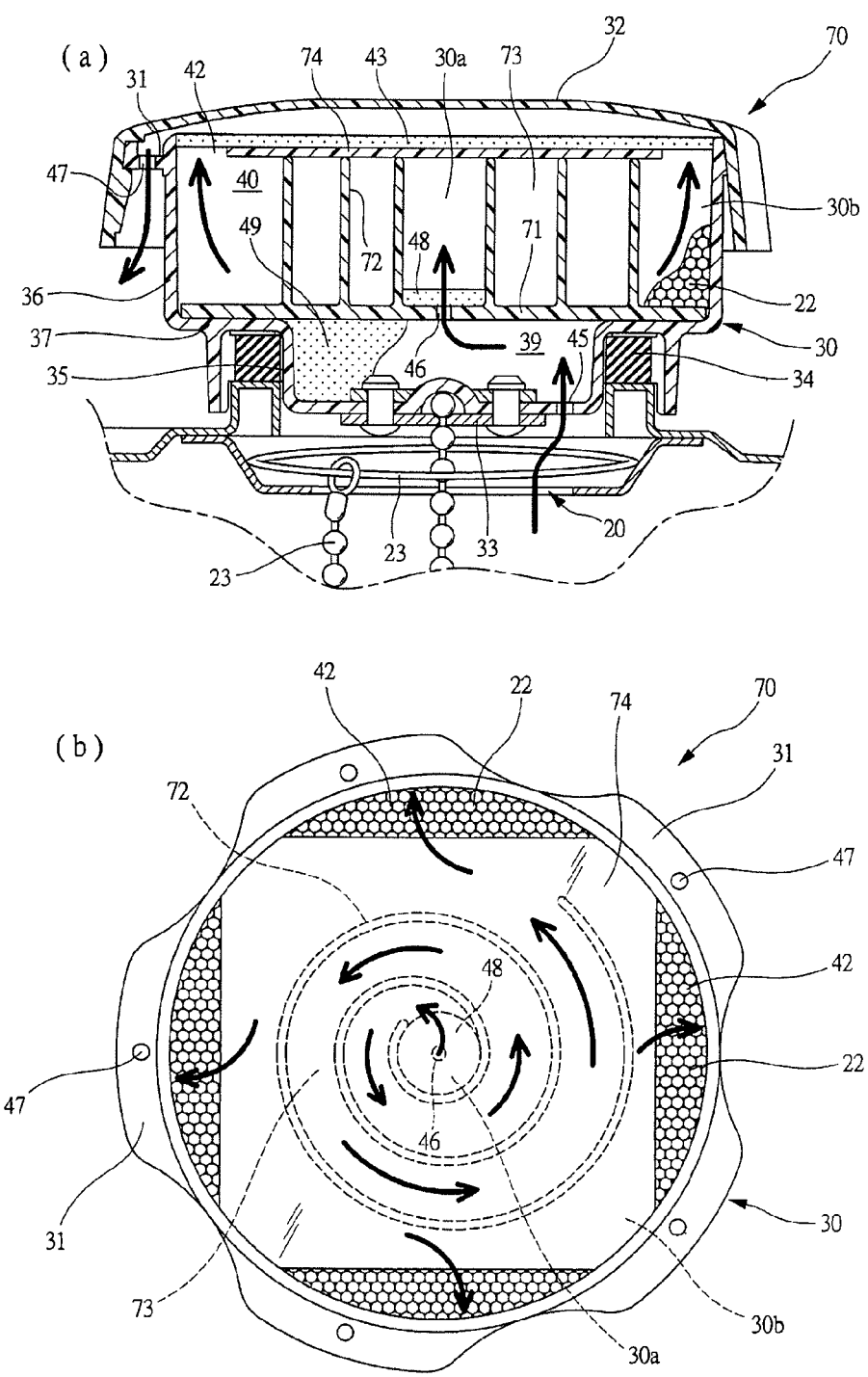
FIG. 8A is a sectional view showing an enlargement of a canister and the vicinity thereof.
FIG. 8B is a plan view showing the canister in a state where the outer cap and the felt have been removed.

Next, a canister (vaporized fuel treatment apparatus) 70 according to a further embodiment of the present invention will be described. Here, FIG. 8A is a sectional view showing an enlargement of the canister 70 and the vicinity thereof, and FIG. 8B is a plan view showing the canister 70 in a state where the outer cap 32 and the felt 43 have been removed. Note that in FIG. 8, similar members to the members shown in FIG. 4 have been allocated identical reference symbols, and description thereof has been omitted. Further, arrows in FIG. 8 show the movement path of the air discharged to the outside from the fuel tank 17.

As shown in FIGS. 8A and 8B, a spiral wall portion 72 oriented toward a partition plate 74 is formed on a partition wall member 71 housed in the inner cap 30. By forming the spiral wall portion 72 in this manner, a spiral conduction passage 73 is defined in the fuel adsorption chamber 40. The conduction passage 73 is formed to link the central portion 30a and the outer peripheral portion 30b of the inner cap 30. By defining the spiral conduction passage 73 in this manner, air containing vaporized fuel can be caused to travel to every corner of the fuel adsorption chamber 40, similarly to the conduction passage 44 described above, and therefore the vaporized fuel can be adsorbed to a large amount of the charged activated carbon 22. Furthermore, by defining the conduction passage 73, the contact time between the activated carbon 22 and the vaporized fuel can be lengthened, and therefore an amount of vaporized fuel adsorbed to the activated carbon 22 can be increased. Hence, the activated carbon 22 can be used effectively, and therefore the amount of the activated carbon 22 charged into the fuel adsorption chamber 40 can be reduced while securing a sufficient vaporized fuel treatment capacity. As a result, reductions can be achieved in the size and cost of the canister 70.

Furthermore, when forming the spiral conduction passage 73, the partition plate (cover member) 74 provided on the open end of the inner cap 30 can be formed in a planar form, and therefore the canister 21 can be assembled extremely easily. More specifically, when the wall portion 41a is provided, as in the partition plate 41 described above, the wall portion 41a must be inserted while pushing away the activated carbon 22. When the planar partition plate 74 is incorporated, on the other hand, the activated carbon 22 does not have to be pushed away, and therefore the canister 70 can be assembled extremely easily.

The present invention is not limited to the embodiments described above, and may be subjected to various modifications within a scope that does not depart from the spirit thereof. For example, in the cases shown in FIGS. 4A, 4B, 6A and 6B, the partition wall members 38 and 51 and the partition plate 41 are formed with respective single wall portions 38a, 41a and 51a, but the present invention is not limited thereto, and a plurality of wall portions may be formed on the partition wall members 38 and 51 and the partition plate 41. Further, in the case shown in FIG. 8, the spiral wall portion 72 is formed only on the partition wall member 71, but the present invention is not limited thereto, and a spiral wall portion may be formed on the partition plate 74 alone or on both the partition wall member 71 and the partition plate 74.

What is claimed is:

1. A vaporized fuel treatment apparatus that is attached to a filler neck of a fuel tank for use and adsorbs vaporized fuel from the fuel tank, comprising:
    a housing attached to the filler neck; and
    a cover member provided on an open end of the housing, wherein, using a partition wall member housed in the housing as a boundary, a gas-liquid separation chamber is defined on a side of the filler neck and a fuel adsorption chamber housing an adsorbent is defined on a side of the cover member,
    a wall portion that defines a conduction passage within the fuel adsorption chamber, the wall portion being formed on at least one of the cover member and the partition wall member, and
    the vaporized fuel from the fuel tank is led from the gas-liquid separation chamber into the fuel adsorption chamber through a through hole formed in a central portion of the partition wall member, and then led to an outer peripheral portion of the housing, which communicates with the outside, through the conduction passage in the fuel adsorption chamber.

2. The vaporized fuel treatment apparatus according to claim 1, wherein, as the wall portion, a cylindrical first wall portion is formed on the partition wall member and a cylindrical second wall portion having a different diameter dimension from the first wall portion is formed on the cover member.

3. The vaporized fuel treatment apparatus according to claim 1, wherein, as the wall portion, a spiral wall portion is formed on at least one of the partition wall member and the cover member.

4. The vaporized fuel treatment apparatus according to claim 1, wherein a buffer chamber is defined between the gas-liquid separation chamber and the fuel adsorption chamber, and the gas-liquid separation chamber communicates with the fuel adsorption chamber via the buffer chamber.

5. The vaporized fuel treatment apparatus according to claim 2, wherein a buffer chamber is defined between the gas-liquid separation chamber and the fuel adsorption chamber, and the gas-liquid separation chamber communicates with the fuel adsorption chamber via the buffer chamber.

6. The vaporized fuel treatment apparatus according to claim 3, wherein a buffer chamber is defined between the gas-liquid separation chamber and the fuel adsorption chamber, and the gas-liquid separation chamber communicates with the fuel adsorption chamber via the buffer chamber.

7. A vaporized fuel treatment apparatus for attachment to a filler neck of a fuel tank to adsorb vaporized fuel from the fuel tank, comprising:
    a housing configured for attachment to a filler neck;
    a cover member releasably attachable to an open end of the housing; and
    a partition wall member configured for reception in the housing, wherein
    the partition wall member is configured for reception in the housing as a boundary arranged between a filler neck and the cover member in such a manner as to separate a space within the housing into a gas-liquid separation chamber on a filler-neck side of the partition wall member and a fuel adsorption chamber on a cover-member side of the partition wall member,
    at least one of the cover member and the partition wall member includes a wall portion that is configured to define a conduction passage within the fuel adsorption chamber, and
    the apparatus is configured such that, when attached to a filler neck of a fuel tank, there is defined a vaporized fuel passage leading from the fuel tank to the gas-liquid separation chamber, through the partition wall member, into the fuel adsorption chamber, and through the conduction passage in the fuel adsorption chamber, to an outer peripheral portion of the housing, and to an outside atmosphere.

8. The vaporized fuel treatment apparatus according to claim 7, wherein, as the wall portion, a cylindrical first wall portion is formed on the partition wall member and a cylindrical second wall portion having a different diameter dimension from the first wall portion is formed on the cover member.

9. The vaporized fuel treatment apparatus according to claim 7, wherein, as the wall portion, a spiral wall portion is formed on at least one of the partition wall member and the cover member.

10. The vaporized fuel treatment apparatus according to claim 7, wherein a buffer chamber is defined between the gas-liquid separation chamber and the fuel adsorption chamber, and the gas-liquid separation chamber is in fluid communication with the fuel adsorption chamber via the buffer chamber.

11. The vaporized fuel treatment apparatus according to claim 8, wherein a buffer chamber is defined between the gas-liquid separation chamber and the fuel adsorption chamber, and the gas-liquid separation chamber is in fluid communication with the fuel adsorption chamber via the buffer chamber.

12. The vaporized fuel treatment apparatus according to claim 9, wherein a buffer chamber is defined between the gas-liquid separation chamber and the fuel adsorption chamber, and the gas-liquid separation chamber is in fluid communication with the fuel adsorption chamber via the buffer chamber.

13. A vaporized fuel treatment apparatus for attachment to a filler neck of a fuel tank to adsorb vaporized fuel from the fuel tank, comprising:
   a housing configured for attachment to a filler neck;
   a cover member releasably attachable to an open end of the housing; and
   a partition wall member configured for reception in the housing, wherein
   the partition wall member is configured for reception in the housing as a boundary arranged between a filler neck and the cover member in such a manner as to separate a space within the housing into a gas-liquid separation chamber on a filler-neck side of the partition wall member and a fuel adsorption chamber on a cover-member side of the partition wall member,
   at least one of the cover member and the partition wall member includes a wall portion that is configured to define a conduction passage within the fuel adsorption chamber,
   the apparatus is configured such that the fuel absorption chamber may be filled with fuel vapor absorbent material through the open end of the housing while the partition wall member is received in the housing, and
   the apparatus is configured such that, when attached to a filler neck of a fuel tank, there is defined a vaporized fuel passage leading from the fuel tank to the gas-liquid separation chamber, through the partition wall member, into the fuel adsorption chamber and through the conduction passage in the fuel adsorption chamber, to an outside atmosphere.

14. The vaporized fuel treatment apparatus according to claim 13, wherein, as the wall portion, a cylindrical first wall portion is formed on the partition wall member and a cylindrical second wall portion having a different diameter dimension from the first wall portion is formed on the cover member.

15. The vaporized fuel treatment apparatus according to claim 13, wherein, as the wall portion, a spiral wall portion is formed on at least one of the partition wall member and the cover member.

16. The vaporized fuel treatment apparatus according to claim 13, wherein a buffer chamber is defined between the gas-liquid separation chamber and the fuel adsorption chamber, and the gas-liquid separation chamber is in fluid communication with the fuel adsorption chamber via the buffer chamber.

17. The vaporized fuel treatment apparatus according to claim 14, wherein a buffer chamber is defined between the gas-liquid separation chamber and the fuel adsorption chamber, and the gas-liquid separation chamber is in fluid communication with the fuel adsorption chamber via the buffer chamber.

18. The vaporized fuel treatment apparatus according to claim 15, wherein a buffer chamber is defined between the gas-liquid separation chamber and the fuel adsorption chamber, and the gas-liquid separation chamber is in fluid communication with the fuel adsorption chamber via the buffer chamber.

* * * * *